United States Patent [19]

McCord et al.

[11] Patent Number: 4,644,399
[45] Date of Patent: Feb. 17, 1987

[54] VIDEO/DIGITAL DATA MULTIPLEXER

[75] Inventors: Marion McCord, Encinitas; Arturo Arriola, San Ysidro; Steven J. Cowen, San Diego, all of Calif.

[73] Assignee: The United States of America as represented by the Secretary of the Navy, Washington, D.C.

[21] Appl. No.: 490,706

[22] Filed: May 2, 1983

[51] Int. Cl.[4] .............................................. H04N 7/08
[52] U.S. Cl. .................................... 358/142; 358/147
[58] Field of Search ............... 358/142, 147, 145, 143, 358/144, 146, 12, 13; 370/10; 375/23

[56] References Cited

U.S. PATENT DOCUMENTS

| | | | |
|---|---|---|---|
| 2,457,819 | 1/1949 | Hoeppner | 178/79 |
| 2,624,797 | 1/1953 | Lawson et al. | 358/145 |
| 2,671,130 | 3/1954 | Weighton et al. | 358/145 |
| 3,209,259 | 9/1965 | Huber | 375/23 |
| 3,446,914 | 5/1969 | Hodge | 358/145 |
| 3,466,387 | 9/1969 | Rout | 358/145 |
| 3,941,919 | 3/1976 | Baker | 358/142 |
| 4,216,492 | 8/1980 | Schmalz | 358/142 |
| 4,357,634 | 11/1982 | Chung | 375/23 |

Primary Examiner—Tommy P. Chin
Assistant Examiner—David E. Harvey
Attorney, Agent, or Firm—Robert F. Beers; Edmund W. Rusche, Jr.; John Stan

[57] ABSTRACT

An apparatus and method is provided wherein a television signal being transmitted may be modified by multiplexing in a digital information-bearing signal in a manner that binary pulses are encoded upon horizontal synchronizing pulse windows contained within the composite video signal. The apparatus comprises two primary subsystems, an encoder and a decoder. The encoder is further composed of four components (1) a horizontal synchronous pulse detector, (2) a pulse position modulator, (3) a digital signal conditioner, and (4) a mixer. The decoder consists of three components: (1) a horizontal synchronizing detector, (2) a pulse position demodulator, and (3) a digital signal conditioner. Functionally, the video/digital data multiplexer is a pulse position (PPM) digital communication system which utilizes the leading edge of the horizontal synchronizing pulses of a composite video signal as a marker denoting the location where a pulse will be inserted. Specifically, the video/data multiplexer inserts a 1-microsecond pulse into each valid horizontal synchronizing pulse window. The position of the 1-microsecond pulse in either one of two locations within the horizontal synchronizing pulse window is then determined by the input binary signal from the digital signal conditioner. Consequently the video signal becomes a carrier for binary (digital) information bearing signals.

4 Claims, 4 Drawing Figures

FIG. 2 SIMPLIFIED DIAGRAM OF V/DM ENCODER

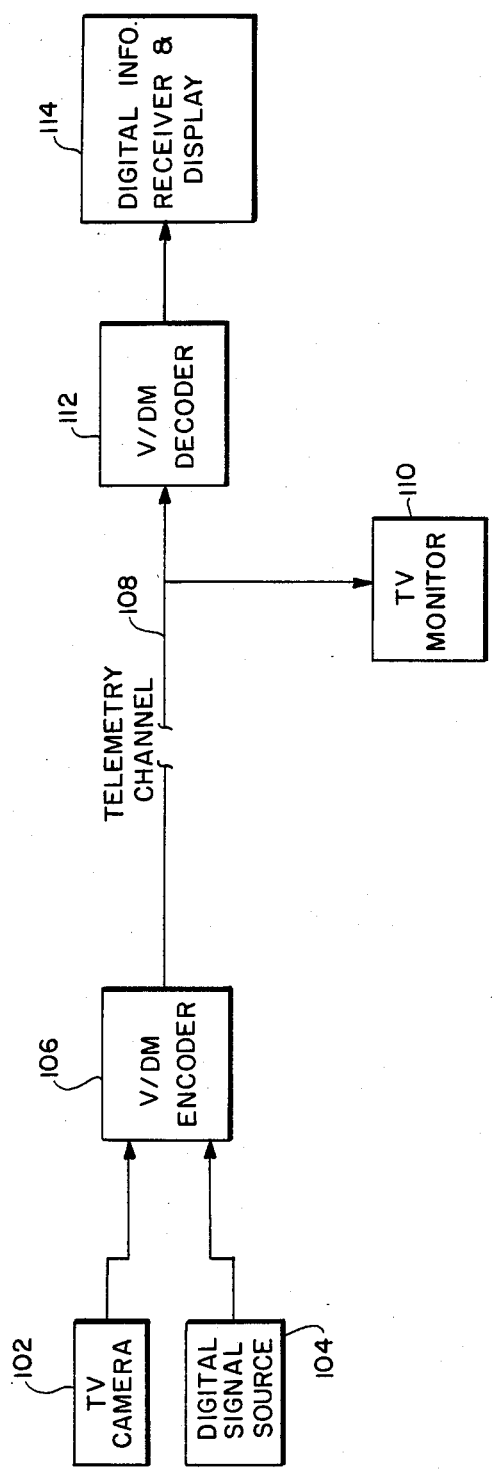
FIG. 1 V/DM FUNCTIONAL BLOCK DIAGRAM

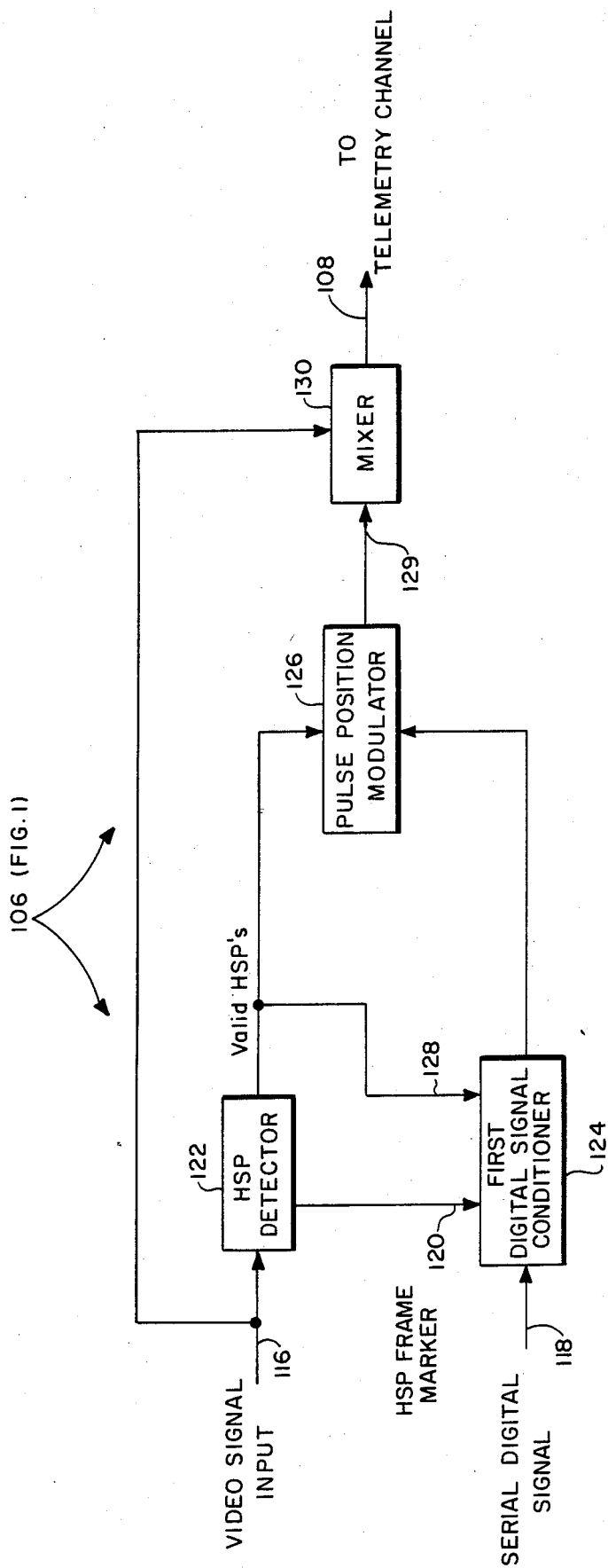
FIG. 2 SIMPLIFIED DIAGRAM OF V/DM ENCODER

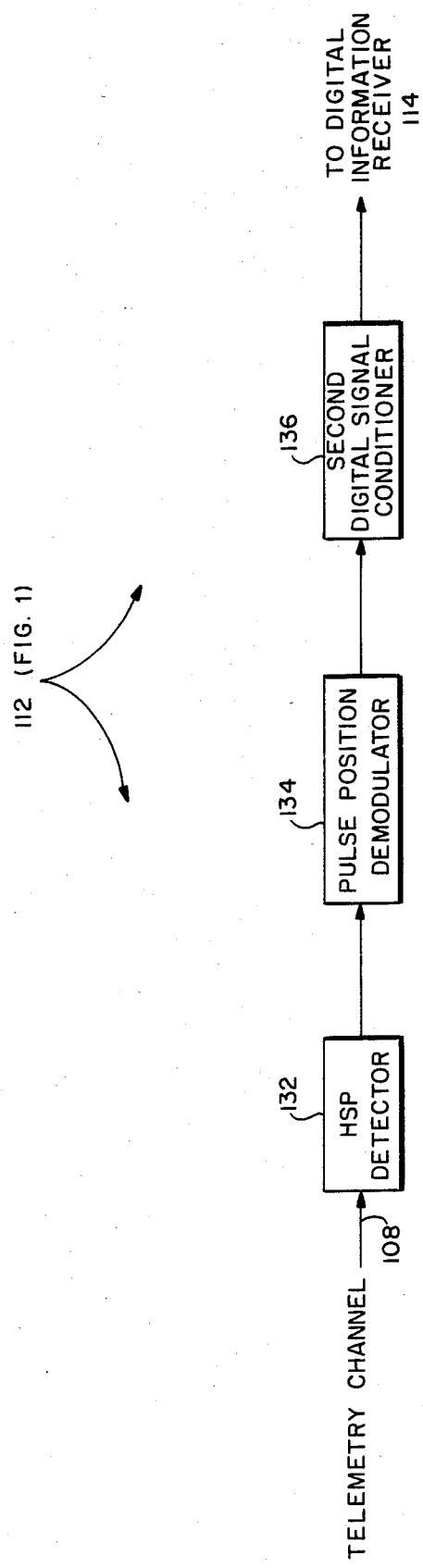
FIG. 3 SIMPLIFIED BLOCK DIAGRAM OF V/DM DECODER

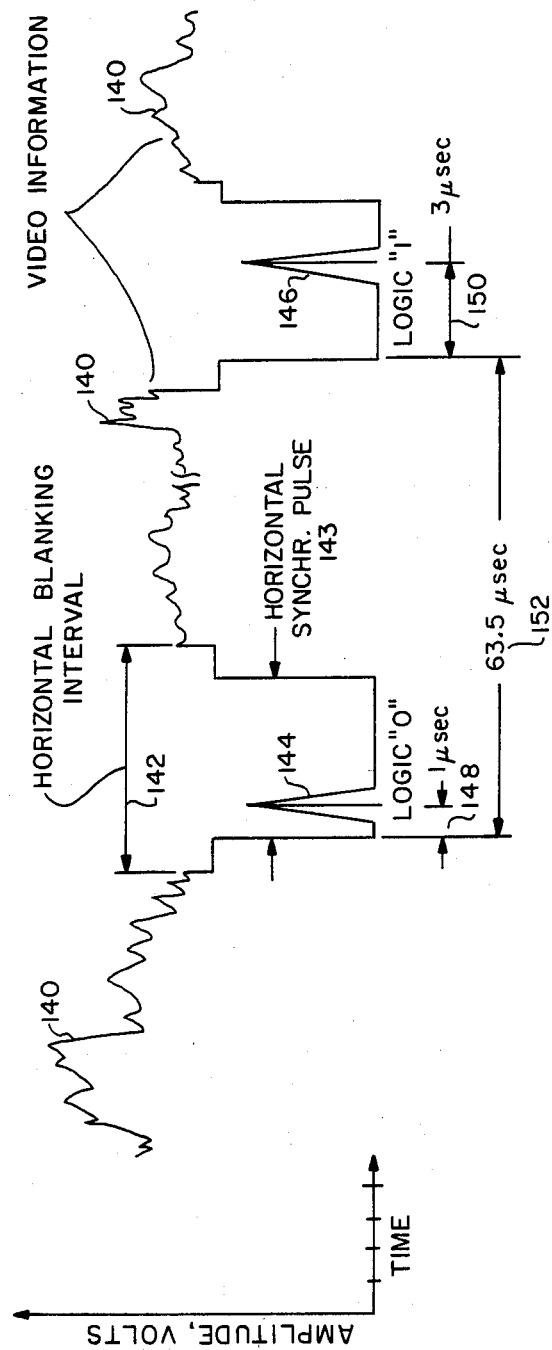
FIG. 4 INFORMATION ENCODING SCHEME FOR V/DM 4,644,399

VIDEO/DIGITAL DATA MULTIPLEXER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The use of video systems by the U.S. Navy is well established. It has become standard practice to transmit image information over varying lengths of telemetry connections to television monitors. Such systems and techniques are finding widespread application in undersea systems.

Besides transmitting image information, a television camera also transmits timing pulses, called synchronizing pulses, which are used for horizontal and vertical synchronization by the television monitor. These timing pulses occur in intervals, called blanking intervals, outside the normal television monitoring viewing area. Also, these pulses are of sufficient duration and repetition rate such that they can be used as carriers for additional information bearing signals.

In addition to video information transmitted over telemetry links, digital information bearing signals are also extensively utilized for carrying data and can be transmitted over long telemetry cabled systems. It is the intent of this invention to combine the two requirements, transmitting video data as well as transmitting digital information, into one signal transmitted via a telemetry link.

SUMMARY OF THE INVENTION

This invention addresses the problem of transmitting both video and digital data via a telemetry link between the source system and the receiver and monitoring systems. More specifically it is concerned with a method and apparatus for multiplexing digital information bearing signals onto a video, or television, signal in a manner that one telemetry channel may carry both types of information to their respective receivers.

A video/digital data multiplexer system is presented which utilizes the horizontal synchronizing pulses (HSP) of a video signal as a carrier for binary (digital) information bearing signals. Functionally, the video/digital data multiplexer is a pulse position modulation digital communication system which utilizes the horizontal sync pulses of a video signal as a marker. Specifically, the video/digital data multiplexer inserts a one-microsecond pulse into each valid horizontal sychronizing window. The specific position of the one-microsecond pulse within each horizontal synchronizing pulse window is then determined by an input binary signal. Consequently, the video signal becomes a carrier for binary (digital) information bearing signals.

The video/digital data multiplexer consists of two primary subsystems, an encoder and a decoder. The encoder is further composed of four components: (1) a horizontal sync pulse detector, (2) a pulse position modulator, (3) a digital signal conditioner, and (4) a mixer. The decoder consists of three components: (1) an HSP detector, (2) a pulse position demodulator, and (3) a digital signal conditioner.

OBJECTS OF THE INVENTION

An object of the invention is to present a method and apparatus which simultaneously transmits video data and digital data to a receiver which separates the two signals for further processing and use.

A second object of the invention is to present a method and apparatus which modulates input binary signals onto a carrier video signal for transmission along a telemetry channel to a receiver which separates the digital signal from the video signal for further processing and use.

A further object of the invention is to present a method and apparatus which utilizes the horizontal synchronizing pulses of a video signal to carry short digital pulses coded thereupon with binary information, transmitting the combined signal along the telemetry channel, and receiving said composite signal to be demodulated into its respective video signal and digital information bearing signal.

Other objects, advantages and novel features of the invention will become apparent from the following detailed description of the invention when considered in conjunction with the accompanying drawings.

DESCRIPTION OF THE DRAWINGS

FIG. 1 presents a functional block diagram of the video/digital data multiplexer.

FIG. 2 presents a simplified diagram of the encoder portion of the video/digital date multiplexer.

FIG. 3 presents a simplified block diagram of the decoder portion of the video/digital data multiplexer.

FIG. 4 displays the video waveform which shows the information encoding scheme used for the video/digital data multiplexer.

DESCRIPTION OF THE PREFERRED EMBODIMENT

A simplified block diagram of the video/digital data multiplexer system is shown in FIG. 1. As illustrated it consists of two primary subsystems, an encoder 106 and a decoder 112. The encoder 106 receives the video signal from a TV camera 102, and a digital information bearing signal from a digital signal source 104. The role of the encoder is to condition the input digital signal and pulse position modulate it onto the video signal from the TV camera.

Following modulation in encoder 106 the composite signal is transmitted by a telemetry channel 108 to be received by a TV monitor 110 and video/digital multiplexer decoder 112. Video/digital multiplexer decoder 112 performs the reciprocal function of encoder 106. TV monitor 110 serves to provide use of the video signal which is essentially unaffected by the digital data multiplexed onto it. Following demultiplexing by the video/digital multiplexer decoder 112, the digital information bearing signal has been retrieved and is then fed to a digital information receiver and display system 114. At this point the digital information bearing signal may be further processed or displayed by any chosen peripheral equipment.

In the preferred embodiment constructed for use, a data rate was obtained of 1200 bits per second (BPS) with a communication mode being simplex and synchronization being asynchronous. The modulation technique is pulse position modulation. Interface is via EIA RS-232C equipment with EIA RS-170 video. The digital word length used has been twelve bits (8 data, 2 stop, 1 start, 1 parity) with an error rate of $10^{-5}$ bits at 1200 BPS.

A simplified block diagram of the video/digital multiplexer encoder 106 is shown in FIG. 2. The encoder consists of three components: (1) a digital signal conditioner 124, (2) a horizontal synchronizing pulse detector 122, (3) a pulse position modulator 126, and (4) a mixer 130.

A video signal input 116 is fed directly from the TV camera into HSP detector 122. The HSP detector separates the composite video sync signal from the video data signal. The HSP detector then separates the composite sync signal into the horizontal synchronizing pulses and the vertical synchronizing pulses (VSP). Two hundred and forty HSP's, called "valid HSP's," are fed into pulse position modulator 126 and, via line 128, into the digital signal conditioner 124. The pulse position modulator 126 and digital signal conditioner 124 utilize the two hundred and forty valid HSP's as a master clock and carrier signal.

The detector 122 also feeds an HSP frame marker signal 120 into digital signal conditioner 124. This frame marker signal is a trigger signal obtained from the vertical synchronous pulses. In addition, at this time twenty to thirty HSP's may be counted out to be ignored before digital data to be added to the remaining HSP's. Following this, the trigger signal occurs which causes the digital data fed into digital signal conditioner 124 to be modulated onto the remaining valid HSP's.

The digital signal enters the encoder 106, FIG. 2, via an RS-232C compatible interface. This interface to digital signal conditioner 124 allows it to accept the data, remove the protocol bits (parity, start, and stop bits) and to store the remaining 8-bit data character in an internal 8×64 FIFO (first in, first out) memory. When the HSP detector detects the presence of a series of "valid" HSP's the protocol bits are restored to each 8-bit data character stored in the FIFO memory and then fed serially, at a rate of 4,800 bits per second, to the input of pulse position modulator 126. On the rising edge of each "valid" HSP, pulse position modulator 126 examines the data present at its input and then varies the position of a 1-microsecond pulse. As is shown in FIG. 4, the 1-microsecond pulse is positioned approximately 1-microsecond and 3-microseconds from the leading edge of the HSP window to indicate an input digital value of "0" and "1", respectively.

Referring back to FIG. 2, mixer 130 then adds the microsecond pulses created by pulse position modulator 126 to the HSP's. The timing of this mixing is already synchronized along both paths, 116 and 129, into mixer 130. From the mixer 130 the composite signal may be transmitted to and through a telemetry channel.

The information encoding scheme used is better shown in FIG. 4. As illustrated, voltage amplitude signals of video information 140 as part of the video signal are systematically interrupted by horizontal blanking intervals 142. These horizontal blanking intervals include the HSP's and they occur every 63.5 microseconds. Each horizontal synchronizing pulse interval provides a position where digital data may be encoded without interfering with the video data. An example of the binary logic digital data encoded in this embodiment is shown. For a logic "0" status a 1-microsecond pulse 144 is injected at approximately a 1-microsecond delay 148 from the leading edge of the horizontal synchronizing interval 143. Similarly, for a logic "1" status, a 1-microsecond pulse 146 is injected at a delay of approximately 3 microseconds 150 from the leading edge of a horizontal synchronizing interval.

A block diagram of the video/digital data modulation decoder 112 is shown in FIG. 3. The decoder is composed of three components: (1) an HSP detector 132, (2) a pulse position demodulator 134, and (3) a digital signal conditioner 136. The HSP detector 132 strips the information containing HSP's from the video signal. The stripped signal is fed into the pulse position demodulator 134 where each HSP is examined. If, following the leading edge of the examined HSP, the presence of a 1-microsecond pulse at the 1-microsecond delay position exists, the pulse position detector 134 outputs a logic "0". However, if a pulse is located at the 3-microsecond delay position, a pulse position demodulator outputs a logic "1". The output of the pulse position demodulator is then fed into digital signal conditioner 136. The digital signal conditioner 136 then compiles the data into 12-bit characters, decreases the bit rate to 1,200 bits per second, and outputs the data via an EIA RS-232C compatible interface.

The data is then in condition to be received by digital information receiver and display equipment 114 for further processing or monitoring as desired.

As is apparent from the above description this apparatus and technique have been designed to inject the digital signal into the horizontal synchronizing pulses of a video signal in a manner not to interfere with normal video transmission and reception, in a manner that is compatible with an EIA RS-232 C computer interface, and in a manner that operation can occur independently of any host computer. Although telemetry may occur using standard electrical techniques, it is also appropriate to consider application of transmission of the encoded data via fiber optic elements. For optical encoding techniques, obviously appropriate transducers and electronic optical converters must be used.

Obviously, many modifications and variations of the present invention are possible in the light of the above teachings. It is therefore to be understood that within the scope of the appended claims the invention may be practiced otherwise than as specifically described.

What is claimed is:

1. An apparatus, including a transmitter, for communicating a time-modulated, binary, information-bearing signal multiplexed onto a composite video signal wherein the transmitter comprises:

first detecting means, connected to a composite video signal source, for detecting the composite video signal and separating from it the horizontal and vertical synchronizing pulses;

means, connected to a digital signal source, for conditioning binary pulses contained within a digital signal output received from the digital signal source said means for conditioning connected to also receive a frame-marker signal, derived from the separated vertical synchronizing pulses, and valid horizontal synchronizing pulses, derived from the separated horizontal synchronizing pulses, from an output of the first detecting means for producing a condition digital signal output representing binary information;

modulating means connected to receive the valid horizontal synchronizing pulses from the first detecting means and the conditioned digital signal output representing binary information from the means for conditioning, said modulating means varying the time position of pulse signals to represent said binary information and to produce the information-bearing signal;

means for mixing the information-bearing signal from the modulating means onto the horizontal synchronizing pulses of the composite video signal received from the video signal source for generating composite digital/video signal for transmission, for example to a telemetry system; and wherein the first detecting means further comprises:

means for counting a plurality, for example 20, of the valid horizontal synchronizing pulses;

means for generating said frame-marker signal, from the separated vertical synchronizing pulses, the frame-marker signal being generated after a last one of said valid horizontal synchronizing pulses has been counted; whereby the first detecting means generates two output signals:

(1) said valid horizontal synchronizing pulses, which are fed to the means for conditioning and to the modulating means; and (2) said frame-marker signal, which causes the conditioned digital signal output to be provided by the means for conditioning to the modulating means.

2. An apparatus as recited in claim 1, further including a receiver for receiving the time-modulated information-bearing signal wherein the receiver comprises:

second detecting means connected to receive the signal output from the means for mixing, said second detecting means functioning to detect the horizontal synchronizing pulses in the composite digital/video signal;

means connected to the second detecting means for demodulating the information-bearing signal contained within the composite digital/video signal; and means for converting the demodulated signal into a proper digital format, said means for converting connected to the output of the means for demodulating; whereby the converted demodulated signal may be further processed or displayed.

3. An apparatus, including a transmitter, for communicating a time-modulated, binary, information-bearing signal multiplexed onto a composite video signal wherein the transmitter comprises:

a first detector connected to receive said composite video signal, said first detector detecting the horizontal and vertical synchronizing pulses in the composite video signal and generating first and second timing signals in response to the detected pulses;

a first digital signal conditioner connected to receive a digital information-bearing signal, and connected to receive the first and second timing signals from the first detector, for providing a conditioned digital signal representing binary information;

a pulse position modulator connected to receive the first timing signals from the first detector and the conditioned digital signal to produce pulse signals which are time-positioned in reference to leading edges of the horizontal synchronizing pulses in the composite video signal to represent said binary information;

a mixer connected to receive the composite video signal and connected to the output of the pulse position modulator whereby the time-positioned pulse signals are inserted onto the horizontal synchronizing pulses of the composite video signal to produce a composite digital/video signal.

4. An apparatus as recited in claim 3, further including a receiver for receiving the time-modulated, binary, information-bearing signal wherein the receiver comprises:

a horizontal synchronizing pulse detector connected to receive the composite digital/video signal;

a pulse position demodulator connected to the output of the horizontal synchronizing pulse detector, whereby the time-positioned pulse signals inserted onto the horizontal synchronizing pulses of the video signal are recovered and demodulated; and a second digital signal conditioner connected to the output of the pulse position demodulator for formatting the demodulated pulse signals in a predetermined manner, for outputting, if desired, to a digital information receiver and display system.

* * * * *